(12) United States Patent
Yoshida

(10) Patent No.: US 6,298,936 B1
(45) Date of Patent: Oct. 9, 2001

(54) SHOCK ABSORBING STOPPER

(75) Inventor: Hiroyuki Yoshida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,495

(22) Filed: Feb. 18, 2000

(30) Foreign Application Priority Data

Feb. 22, 1999 (JP) .................................................. 11-042458

(51) Int. Cl.$^7$ .................................... B60K 5/00; F16F 5/00
(52) U.S. Cl. ............................................ 180/232; 267/140.11
(58) Field of Search ................................... 180/232, 312, 180/291; 267/140.11, 140.12, 140.13, 140.5; 248/569

(56) References Cited

U.S. PATENT DOCUMENTS

| 3,702,178 | * | 11/1972 | Schulz .................................... 248/9 |
| 3,912,295 | * | 10/1975 | Eggert, Jr. ........................ 280/106 R |
| 4,031,978 | * | 6/1977 | Taylor ..................................... 180/91 |
| 4,057,263 | * | 11/1977 | Schwuchow et al. ............. 280/106 R |
| 4,152,012 | * | 5/1979 | Reidelbach et al. .................. 280/784 |
| 4,181,192 | * | 1/1980 | Danckert ............................... 180/232 |
| 4,413,840 | * | 11/1983 | Shah ..................................... 280/784 |
| 4,856,751 | * | 8/1989 | Ohba ..................................... 180/291 |
| 5,090,502 | * | 2/1992 | Inoue et al. .......................... 180/312 |
| 6,120,011 | * | 9/2000 | Maeno et al. .................... 267/140.11 |
| 6,152,521 | * | 11/2000 | Hayashi et al. ...................... 299/188 |
| 6,174,009 | * | 1/2001 | McKeon ............................... 293/133 |
| 6,179,355 | * | 1/2001 | Chou et al. .......................... 293/132 |

FOREIGN PATENT DOCUMENTS 08164869    6/1996   (JP) .

* cited by examiner

Primary Examiner—Brian L. Johnson
Assistant Examiner—Joselynn Y. Sliteris
(74) Attorney, Agent, or Firm—Sughrue, Mion, Zinn, Macpeak & Seas, PLLC

(57) ABSTRACT

A shock absorbing stopper 4 is provided on an automobile body which an engine E is mounted via an engine mount 3 at a portion in front of the engine E and is for absorbing an impact force generated due to the collision between the engine E and automobile body. The shock absorbing stopper 4 is composed of a first buffer member 41 and a second buffer member 42 each having different shock absorbing characteristics mounted in the lengthwise direction of the automobile body. By such a construction, the impact force can be absorbed in a step-by-step manner and thus, the absorbing efficiency can be enhanced.

16 Claims, 6 Drawing Sheets

Prior Art

SHOCK ABSORBING STOPPER

FIELD OF THE INVENTION

The present invention relates to a shock absorbing stopper of an automobile having an engine supported via an engine mount composed of an elastomer or the like. The stopper of the present invention can prevent parts of engine such as a cylinder block and an oil pan from being damaged due to the fact that the engine moves forward to be in contact with the body of the automobile during the course of collision in a light degree (hereinafter referred to as "light collision") such that the bumper or the front portion of the side frame is crushed, and can prevent joint portions of the propeller shaft due to the forward movement of the engine.

DESCRIPTION OF THE RELATED ARTS

Conventionally, in automobiles utilizing a mono-cock body which do not have any special material which is jointed to the forward and backward shafts, a thin plate body supports various external forces. In this case, portions to which a big external force is added such as an engine and a suspension are reinforced by sub-frames. FIG. 6A and FIG. 6B each is an outline drawing showing the conditions where a front sub-frame is fixed on a front side of the automobile body, and an engine mount is placed between the front sub-frame and the engine, where FIG. 6A is a front view and FIG. 6B is a side view.

A front sub-frame S in this prior art has an I-shape, both ends of the front sub-frame are fixed onto side frames SF and SF, and engine mounts EM and EM are provided on the upper surfaces of both ends. The engine mounts EM and EM are mainly composed of a rubber material R for absorbing the vibration of an engine E or such, and metal fittings P and P placed on upper and lower portions of the rubber material R and they support a cylinder block CB via a bracket BR. In FIG. 6B, symbol OP is an oil pan, and symbol TM is a transmission.

As described above, the engine E is provided on a prescribed position of the front sub-frame S via the engine mounts EM and EM which support the cylinder block CB. In addition, a stopper SP is formed on a front portion of the engine E, for example, on a cross-frame CF provided on a front portion of the engine E. The formation of the stopper SP reduces the disadvantage that the engine E moves forwards and collides with the cross-frame at the time of light collision whereby the engine is broken.

In the conventional automobile, the stopper SP has been directly formed, for example, on the cross-frame provided on a front portion of the engine E, by baking a rubber or the like. For this reason, if the rubber has been exhausted, the stopper SP cannot prevent the damage of the engine E and, thus the conventional stopper has a low effect for preventing the damage at the time of the light collision.

Particularly, the damage of the engine proves fatal to the automobile and, thus, from the view of difficulty to be repaired, it is serious disadvantage that damage easily occurs even in the case of the light collision.

Moreover, since the stopper SP is formed by directly baking a rubber material or such onto the cross-frame, or the like, the replacement of the stopper SP becomes on a large scale, leading to the disadvantage of high repair cost.

SUMMARY OF THE INVENTION

An object of the present invention is to solve the problems associated with the prior art and to provide a shock absorbing stopper which can effectively absorb the impact force at the time of the light collision to reduce the damage of the engine E etc., and which can reduce the repair cost.

The object described above can be attained by a shock absorbing stopper for the present invention.

The shock absorbing stopper according to the present invention is provided on an automobile body on which an engine is mounted via an engine mount at a portion in front of the engine and is for absorbing an impact force generated due to the collision between the engine and automobile body, comprising a first buffer member and a second buffer member each having different shock absorbing characteristics mounted in the lengthwise direction of the automobile body.

This makes it possible to absorb the impact force in a step-by-step manner and thus, the absorbing efficiency can be enhanced.

The shock absorbing stopper of the present invention may be composed of the first buffer member in contact with the engine which absorb an impact force due to elastic deformation, and the second buffer member mounted between the first buffer member and the automobile body, which absorbs the impact force transmitted from the first buffer member due to flexible deformation.

According to this embodiment, since the absorption of the impact force can be divided into the first and second buffer members, the impact force can be absorbed in a much more effective manner. Moreover, since the first buffer member in contact with the engine absorbs the Impact force due to elastic deformation, the damage of the engine can be further reduced.

In the shock absorbing stopper according to the present invention, either or both of the first buffer member and the second buffer member and the mounting of the second buffer member and the automobile body are mounted in a detachable manner.

This is advantageous in that when the first or second buffer member is damaged, it can be easily displaced.

In the shock absorbing stopper according to the present invention, the shock absorbing stopper can be composed so that the second buffer member has a frame shape having a connecting portion to be connected to the first buffer member, a mounting portion to be mounted on the automobile body, and a bent portion exhibiting the function of the flexible deformation is provided on the frame shape.

Such a construction makes it possible to enhance the effect of absorbing the impact force of the second buffer due to the flexible deformation.

BRIEF DESCRIPTION OF THE DRAWINGS

FIGS. 5A and 5B are side views showing the function of the shock absorbing stopper according to the present invention, wherein FIG. 5A shows the situation before collision and FIG. 5B shows the situation after collision; FIG. 6A is a front view and FIG. 6B is a side view.

BEST MODE FOR CARRYING OUT THE INVENTION

Figure 1:
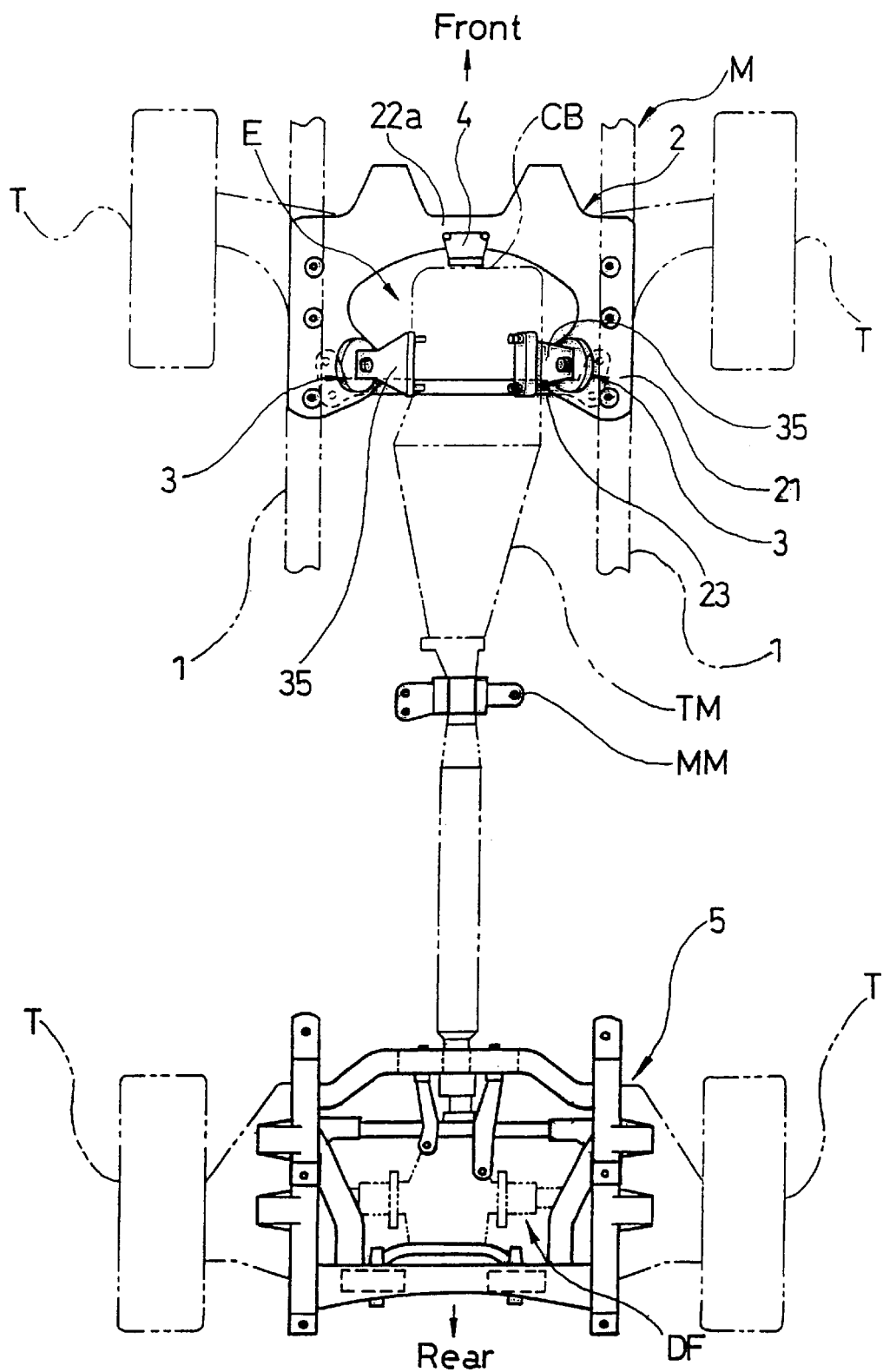
FIG. 1 shows a plane view outlining an internal construction of an automobile body utilizing a mono-cock construction.
Figure 2:
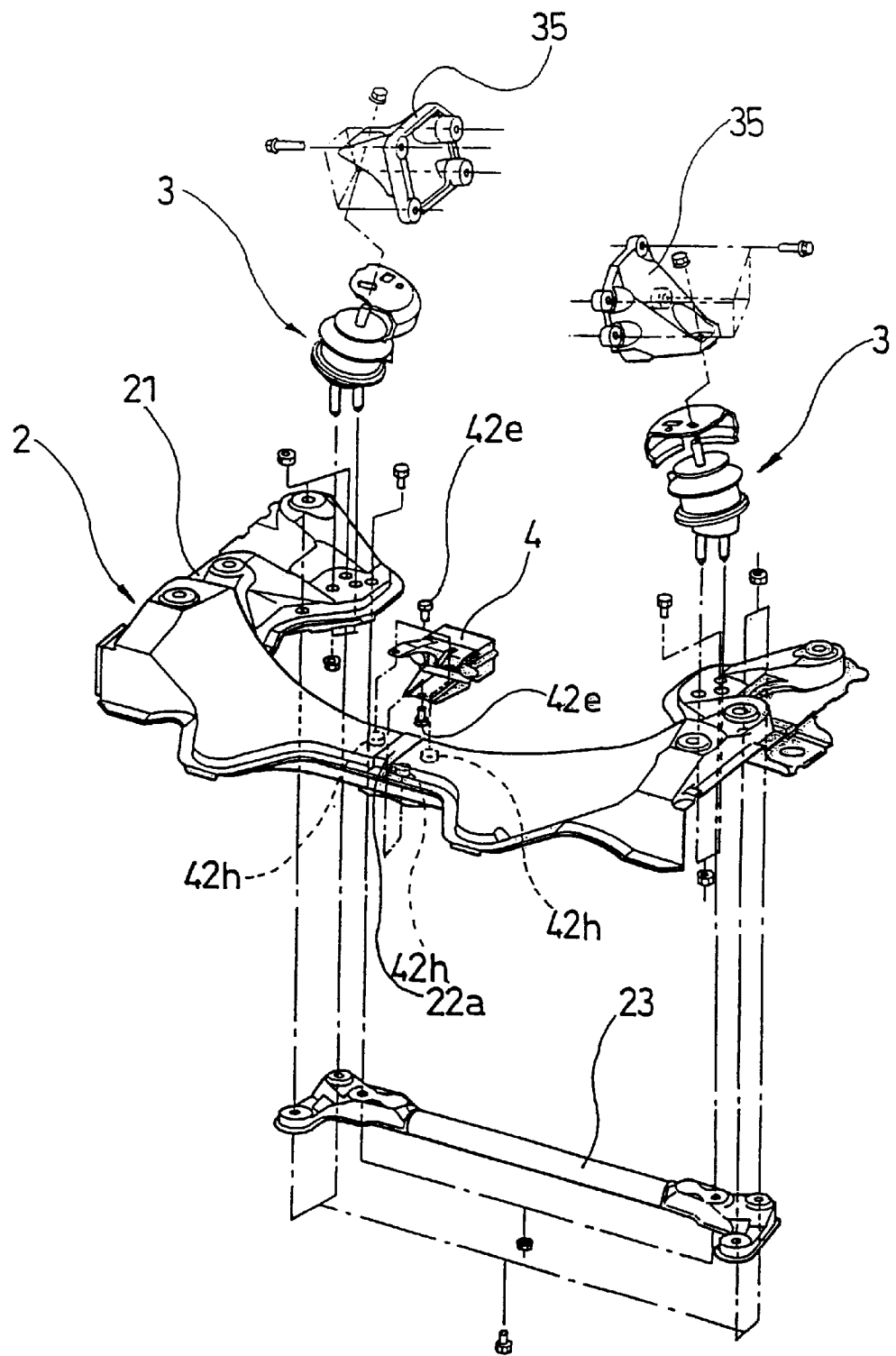
FIG. 2 is an exploded perspective view showing a front sub-frame for mounting the engine and the parts to be equipped with the front sub-frame.

The present invention will now be described in detail by referring to the attached drawings. FIG. 1 shows a plane view outlining an internal construction of an automobile body utilizing a mono-cock construction and FIG. 2 is an exploded perspective view showing a front sub-frame 2 for mounting the engine E and the parts to be equipped with the front sub-frame 2.

The automobile M according to this embodiment utilizes a mono-cock construction which is mainly composed of a front sub-frame 2 for supporting an engine E placed on a front side, and a rear sub-frame 5 for supporting a rear differential equipment DF placed on a rear side. Symbol MM is a transmission mount which supports a transmission TM together with the front sub-frame 2, and symbol T is a wheel.

The front sub-frame 2 is fixed to two side frames 1 and is composed of a lying U-shaped body 21 whose opening is faced toward the rear side, and a cross member 23 lied on the lower surfaces of both ends of the U-shaped body 21. The cross member is lied in order to enhance the rigidity of the U-shaped body 21. Engine mounts 3 and 3 are fit to the upper surfaces of both ends of the U-shaped body 21, and the engine mounts 3 and 3 support and fix a cylinder block CB via brackets 35 and 35. An engine mount 3 is a liquid injection type mount and effectively absorbs the vibration caused by the engine E and the like.

In front of the engine E, a cross member 22a of the front sub-frame 2 is positioned. The cross member 22a is positioned in front of an oil pan (not shown), and the oil pan collides with the cross member 22a when the front of the automobile M is collided. To be specific, the cross member 22a corresponds to the automobile body positioned in front of the engine in this embodiment. The shock absorbing stopper 4 according to this embodiment is mounted on this cross member 22a.

Figure 3:
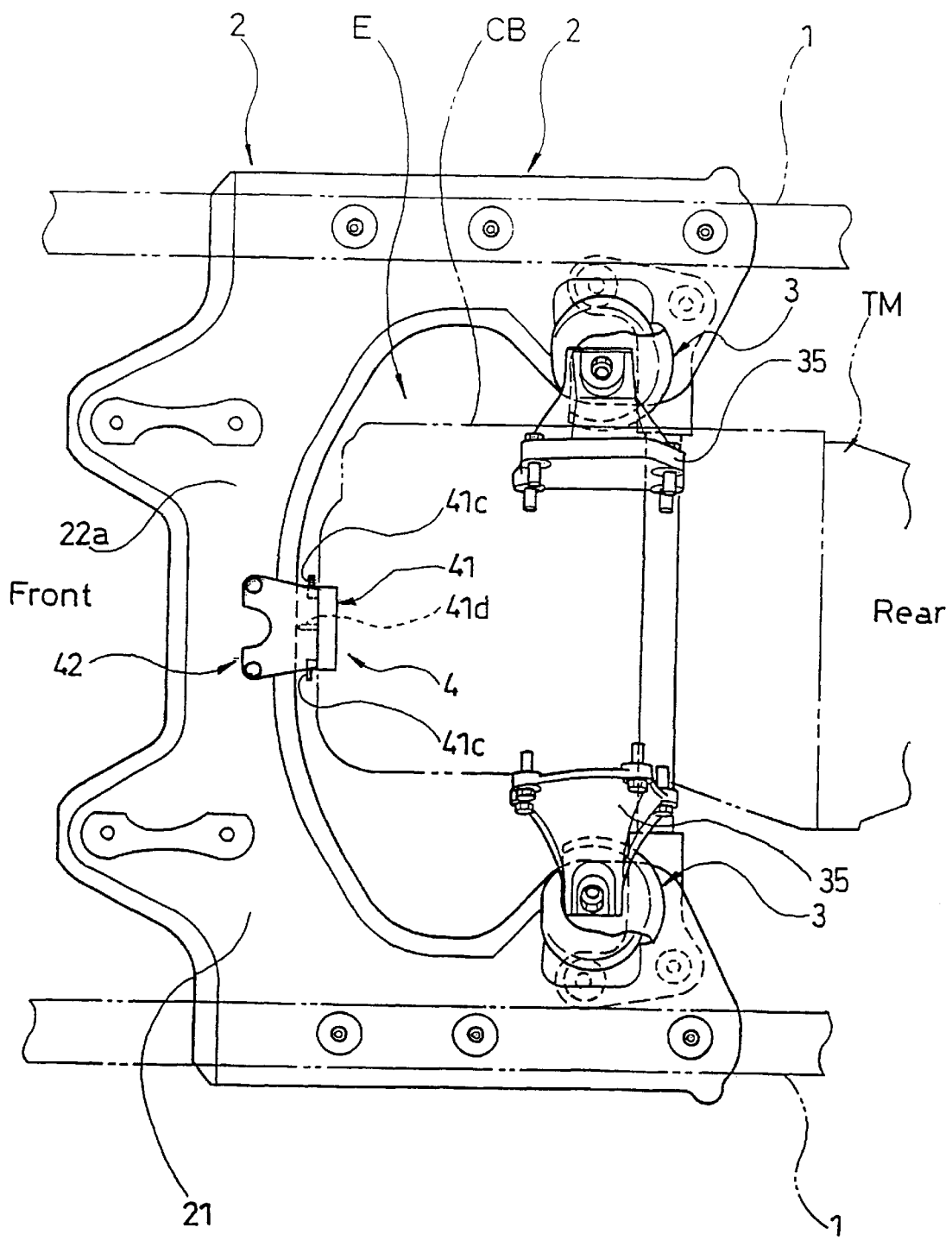
FIG. 3 is an overview showing a front sub-frame for mounting the engine and the parts to be equipped with the front sub-frame.

The construction of the shock absorbing stopper 4 will now be described by referring to FIGS. 3 and 4.

The shock absorbing stopper 4 is composed of a first buffer member 41 and a second buffer member 42 each having different impact absorbing characteristics. The first buffer member 41 and the second buffer member 42 are arranged in series in the lengthwise direction of the automobile body, and the second buffer member 42 is fit to the cross member 22a of the front sub-frame 2 at the side of the engine E.

The first buffer member 41 according to this embodiment is directly in contact with the engine E, and absorbs the impact force due to "elastic deformation". The first buffer member 41 will be described in detail.

Figure 4:
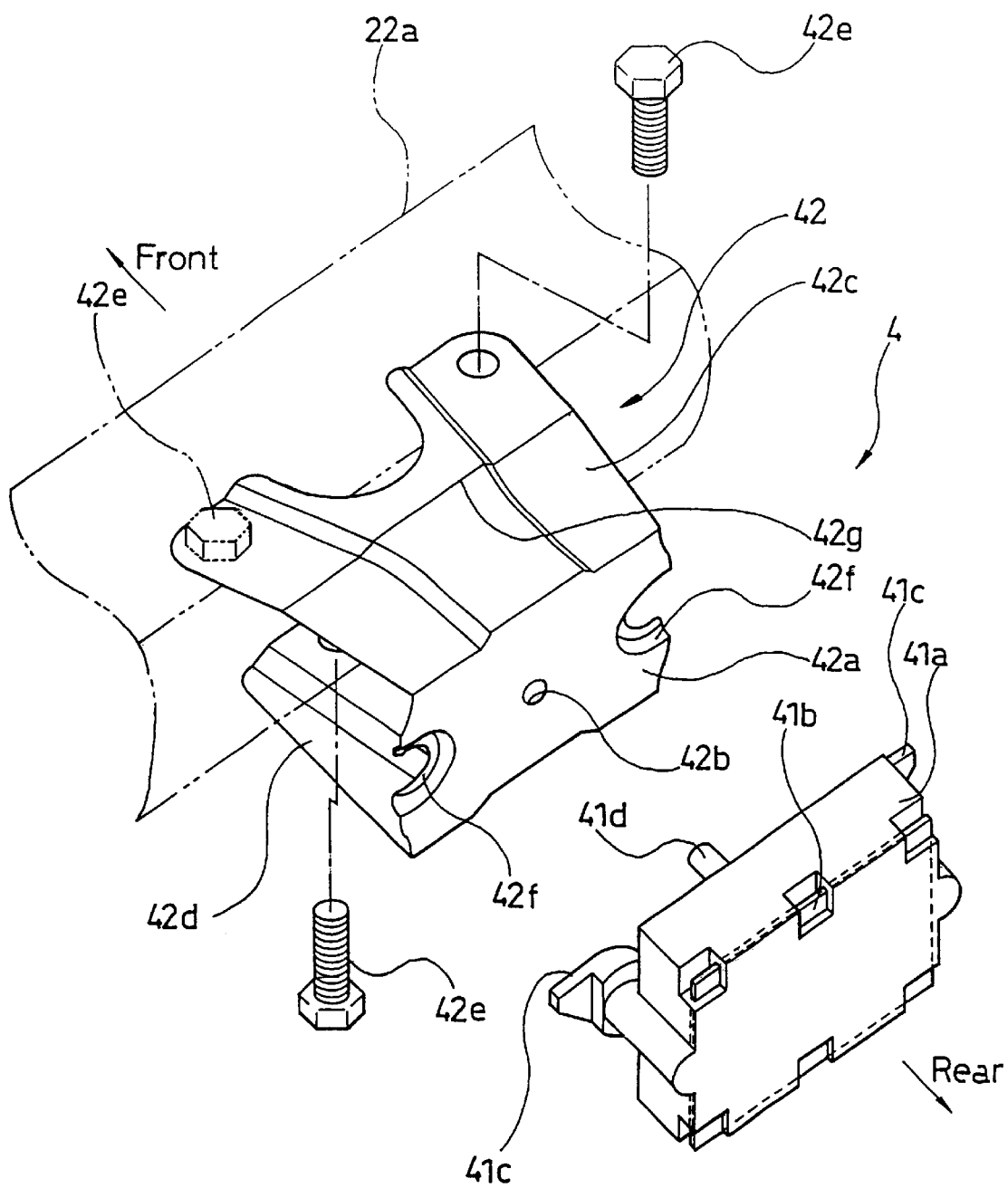
FIG. 4 is an exploded perspective view of a shock absorbing stopper according to the present invention.

As shown in FIG. 4, the first buffer member 41 is mainly composed of a rubber member 41a having a rectangular column into which a reinforcing copper plate 41b is embedded. The surface of the rubber member 41a is in directly contact with the oil pan (not shown), and the rear surface of the rubber material 41a is fit to the second buffer member 42. On both side ends of the rear surface, which are symmetrical, communicating projections 41c and 41c are formed, and at the center of the rear side, a pin portion 41d is projected. These communicating projections 41c and 41c and the pin portion 41d are engaged with a connector 42a of the second buffer member 42, which will be described later on.

Consequently, the second buffer member 42 will be described in detail. The second buffer member 42 according to this embodiment has an approximate lying U-shape when viewing from the side, and the opening is faced toward the front side and placed at the position to hold the cross member 22a. To be specific, the ends of an upper bracket 42c and a lower bracket 42d, which clamp the cross member 22a make up a fitting portion.

The ends of the upper bracket 42c and the lower bracket 42d and the upper and lower surfaces of the cross member 22a have through holes to penetrate bolts 42e, 42e, . . . To be screwed. By means of these bolts 42e, 42e, . . . and nuts 42h, 42h . . . , the second buffer member 42 is fit. The cross member 22a is a hollow member, and when it is fit, nuts 42h are inserted into traverse holes (not shown) provided on the cross member 22a (see FIG. 2). Then, the second buffer member 42 is fit by fasting the bolts 42e . . . To the nuts 42h . . . . Since the second buffer member 42 is fit by means of the bolts 42e . . . and nuts 42h . . . , it is detachable.

The upper bracket 42c of the second buffer member 42 extends backwards, i.e., toward the rear side, and the upper bracket 42c is bent on the way and tilted downwards to make up a bent portion 42g. The bent portion 42g further extends backwards and then is further bent to form a vertical surface making up a connector 42a. The connector 42a has symmetrical ends on which communicating grooves 42f and 42f are formed, and a center portion on which a pin hole 42b is formed. These communicating grooves 42f and 42f and the pin hole 42b are related to the communicating projections 41c and 41c and the pin portion 41d of the first buffer member 41, respectively, and they are engaged to fit the first buffer member 41 to the second buffer member 42.

According to this embodiment, the pin portion 41d is inserted into the pin hole 42b and aligned, then the symmetrical communicating projections 41c and 41c are communicated with the communicating grooves 42f and 42f from outside to fit the first buffer member 41 to the second buffer member 42. For this reason, the shock absorbing stopper 4 can easily be mounted, and it cannot easily come off. Furthermore, due to fitting by the communication, the shock absorbing stopper 4 is detachable.

The upper bracket 42c, the connector 42a, and the lower bracket 42d which are made of steel make up a frame in which the front side is opened, and a gap is formed in the frame in the state of being fit to the cross member 22a of the front sub-frame. By the formation of the gap, the second buffer member 42 is deformed at the time of undergoing the shock, resulting in the absorption of the impact force by "flexible deformation". The construction of the second buffer member 42 is not restricted to the lying U-shape as shown in this embodiment, and may be any frame shape as long as the second buffer member 42 is included between the first buffer member 41 and an automobile body such as the front sub-frame 2, an internal gap is formed therebetween, and the impact force can be absorbed due to the flexible deformation.

Figure 5A:
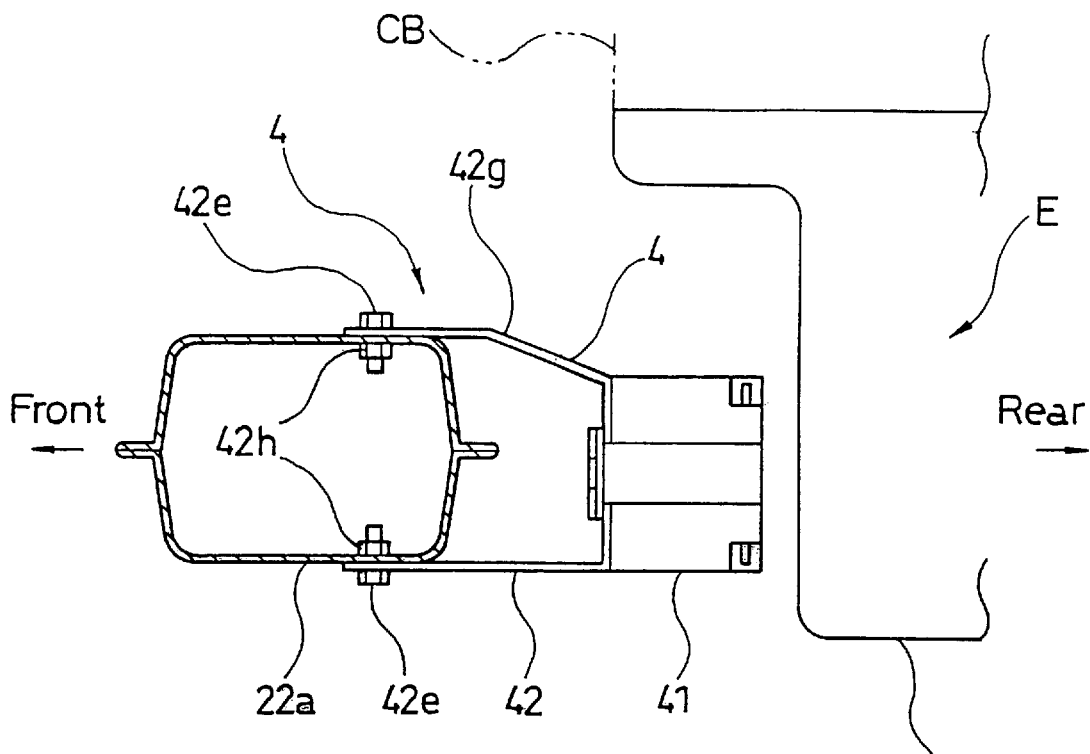

Next, the functions of the shock absorbing stopper will be described by referring to FIG. 5.

The shock absorbing stopper 4 is fit in front of the engine E as described above. The shock absorbing stopper 4 according to this embodiment has the same height as the front height of the oil pan which is a part of the engine E (see FIG. 5A).

Figure 5B:
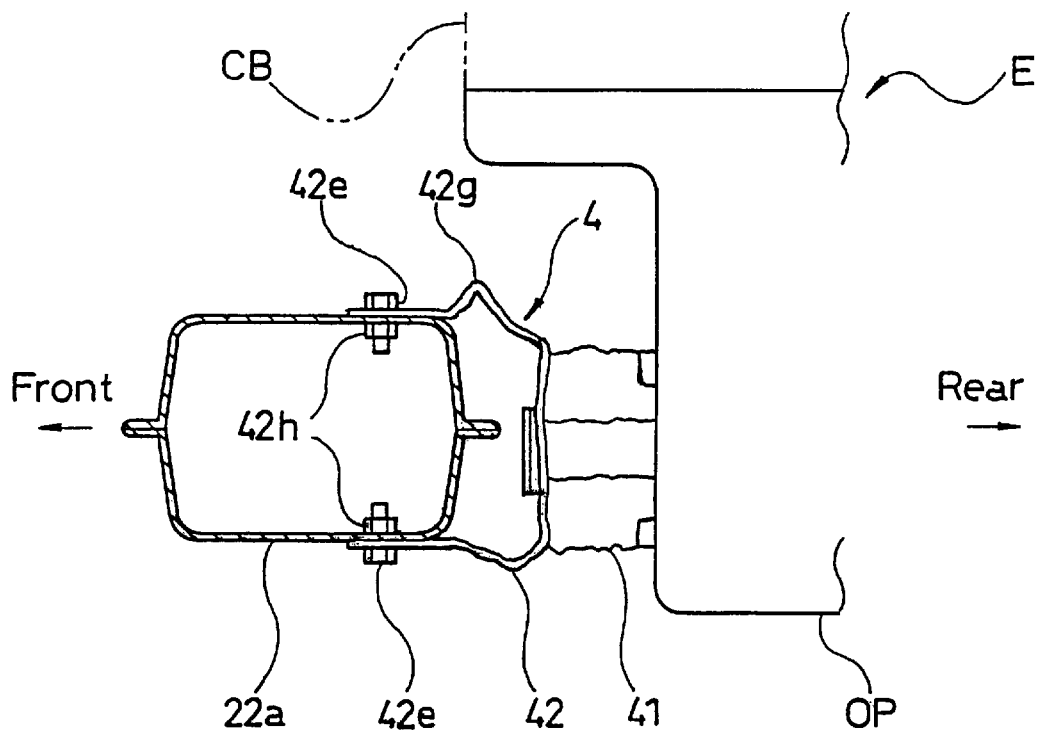
Figure 6A:
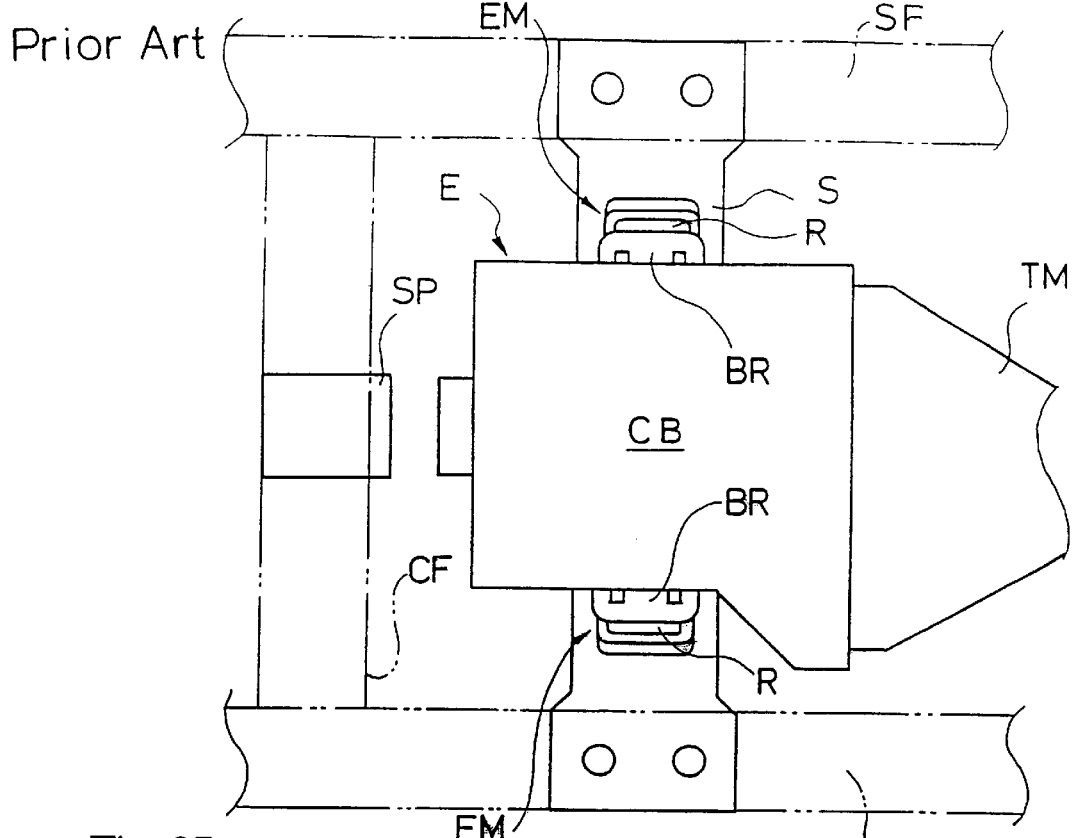
FIGS. 6A and 6B are conventional outline drawings showing the conditions where a front sub-frame is fixed on a front side of the automobile body, and an engine mount is placed between the front sub-frame and the engine, where
Figure 6B:
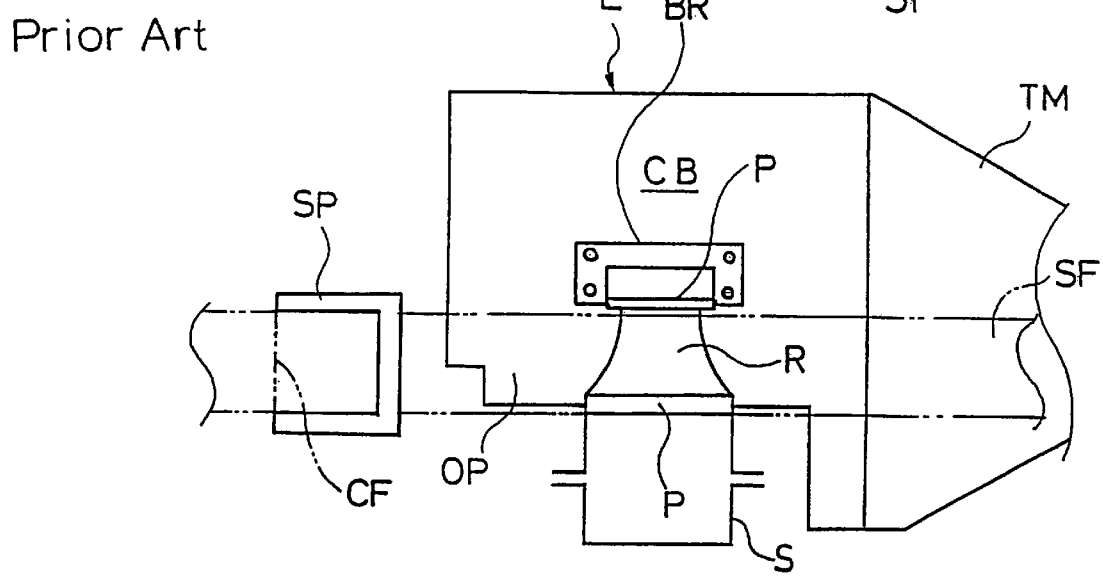

At the time of the light collision, the engine E moves forward due to the force of the inertia (see FIG. 5B). By this movement, the engine E (oil pan OP) bumps against the shock absorbing stopper 4. Then, the first buffer member 41 absorbs and relaxes the impact force to some degrees, and transmits the remaining impact force to the second buffer member 42.

When the impact force is transmitted to the second buffer member 42, the bent portion 42g is bent, and then deformed as a whole (flexible deformation) to absorb the impact force. By the absorption of the impact force due to the first buffer member 41 and the second buffer member 42, the damage of the engine E, the front sub-frame 2, and the like can be reduced, especially leading to the protection and reinforcement of the engine E.

According to the shock absorbing stopper of the present invention, the impact force can be absorbed in a step-by-step manner.

Since the first buffer member and the second buffer member, and the second buffer member and the automobile body are fit in a detachable manner, only the part required for repair is replaced, saving the repair cost.

When the second buffer member has a bent portion, the effect of absorbing the impact force is enhanced due to much more effective flexible deformation.

While the construction and the functions of the shock absorbing stopper of the present invention have been described on the basis of the specific embodiment, the present invention is not restricted such a specific embodiment. For example, the first buffer member absorbs the impact force due to the elastic deformation and the second buffer member absorbs the impact force due to the flexible deformation, or vice versa. Also, any construction may be applicable as long as the first buffer member and. the second buffer member absorb the impact force due to different absorbing characteristics.

What is claimed is:

1. A shock absorbing stopper provided on an automobile body on which an engine is mounted via an engine mount, the shock absorbing stopper is disposed at a portion in front of the engine and is for absorbing an impact force generated due to a collision between the engine and automobile body, the shock absorbing stopper comprising a first buffer member and a second buffer member each having different shock absorbing characteristics mounted in a lengthwise direction of the automobile body.

2. The shock absorbing stopper as claimed in claim 1, which is composed of the first buffer member in contact with the engine which absorbs an impact force due to elastic deformation, and the second buffer member mounted between the first buffer member and the automobile body, which absorbs the impact force transmitted from the first buffer member due to flexible deformation.

3. The shock absorbing stopper as claimed in claim 2, wherein either or both of the first buffer member and the second buffer member and the mounting of the second buffer member and the automobile body are mounted in a detachable manner.

4. The shock absorbing stopper as claimed in claim 3, wherein said second buffer member is a bracket having a U-shape cross section and having a connecting portion to be connected to the first buffer member, a mounting portion to be mounted on the automobile body, and a bent portion exhibiting a function of the flexible deformation provided on the bracket.

5. The shock absorbing stopper as claimed in claim 2, wherein said second buffer member is a bracket having a U-shape cross section and having a connecting portion to be connected to the first buffer member, a mounting portion to be mounted on the automobile body, and a bent portion exhibiting a function of the flexible deformation provided on the bracket.

6. The shock absorbing stopper as claimed in claim 1, wherein either or both of the first buffer member and the second buffer member and the mounting of the second buffer member and the automobile body are mounted in a detachable manner.

7. The shock absorbing stopper as claimed in claim 6, wherein said second buffer member is a bracket having a U-shape cross section and having a connecting portion to be connected to the first buffer member, a mounting portion to be mounted on the automobile body, and a bent portion exhibiting a function of flexible deformation provided on the bracket.

8. The shock absorbing stopper as claimed in claim 1, where said second buffer member is a bracket having a U-shape cross section and having a connecting portion to be connected to the first buffer member, a mounting portion to be mounted on the automobile body, and a bent portion exhibiting a function of flexible deformation provided on the bracket.

9. The shock absorbing stopper as claimed in claim 1, wherein the first buffer member is positioned in series behind the second buffer member, so that, during the collision between the engine and the automobile body, the first buffer member contacts the engine before the second buffer is deformed by the collision.

10. A vehicle, comprising:
    two side frames extending in a longitudinal direction of the vehicle, the longitudinal direction of the vehicle being parallel to an axis running from a rear to a front of the vehicle, and a subframe connected to the two side frames and extending in a lateral direction of the vehicle that is transverse to the longitudinal direction;
    an engine positioned substantially between the two side frames in the lateral direction of the vehicle;
    a shock absorbing stopper mounted to the subframe in front of the engine so as to absorb an impact of the engine against the subframe during a front end collision of the vehicle, the shock absorbing stopper comprising a first buffer member and a second buffer member;
        wherein the first buffer member and the second buffer member have different shock absorbing characteristics.

11. The vehicle according to claim 10, wherein the first buffer member is positioned in series behind the second buffer member so that, during the front end collision of the vehicle, the engine collides with the first buffer member and compresses the first buffer member before causing deformation of the second buffer member.

12. The vehicle according to claim 11, wherein the first buffer member is substantially made of an elastomeric material and the second buffer member is bolted to the subframe.

13. The vehicle according to claim 10, wherein the shock absorbing stopper is substantially centered in the lateral direction with respect to the subframe.

14. The vehicle according to claim 10, wherein the second buffer member is a bracket having a U-shape cross section opened towards the front of the vehicle and comprises:
- a connecting portion at one end of the bracket nearest the engine that connects to the first buffer member,
- a mounting portion mounted to the subframe; and
- a bent portion that causes the bracket to collapse upon receiving a force in the longitudinal direction of the vehicle during the front end collision of the vehicle.

15. The vehicle according to claim 14, wherein the second buffer member is coupled to the subframe so as to be detachable without permanently altering the second buffer member and subframe, and wherein the first buffer member is coupled to the second buffer member so as to be detachable without permanently altering the first buffer member and the second buffer member.

16. The vehicle according to claim 10, wherein a cross-section of the second buffer member taken along a vertical plane parallel to the longitudinal axis of the vehicle has a substantial U-shape.

\* \* \* \* \*